March 10, 1925.
C. C. ADDINGTON
1,529,565
AUTOMATIC GAME AND RAT TRAP
Filed April 16, 1924    2 Sheets-Sheet 1

C. C. Addington
INVENTOR
BY Victor J. Evans
ATTORNEY

WITNESS

Patented Mar. 10, 1925.

1,529,565

UNITED STATES PATENT OFFICE.

CHARLES C. ADDINGTON, OF GATE CITY, VIRGINIA.

AUTOMATIC GAME AND RAT TRAP.

Application filed April 16, 1924. Serial No. 706,982.

*To all whom it may concern:*

Be it known that I, CHARLES C. ADDINGTON, a citizen of the United States, residing at Gate City, in the county of Scott and State of Virginia, have invented new and useful Improvements in Automatic Game and Rat Traps, of which the following is a specification.

This invention relates to animal traps, and contemplates a structure wherein the trapping element is in the nature of an arm adapted to be adjustably swung from an inactive to an active position when released by the animal in an effort to secure the bait, and which arm is so arranged with relation to the bait holder, that the arm operates to break the neck of the animal, or to sever the head of the animal should the arm be constructed for this purpose.

In carrying out the invention, I employ a mechanism for automatically resetting the trapping element after each operation thereof, the element being independently actuated by a resilient means subsequent to its release by the animal actuated means, which of course is operated by an animal in an attempt to secure the bait.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 5:
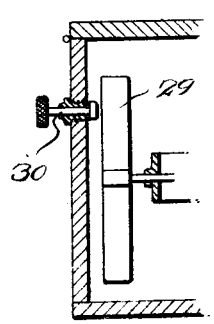

Figure 5 is a sectional view showing the governor for controlling the rewinding of the resetting mechanism.

Figure 6:
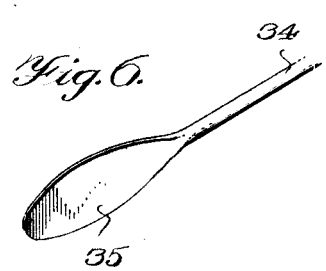

Figure 6 is a fragmentary view of the animal actuated rod for effecting the release of the tripping element.

Figure 1:
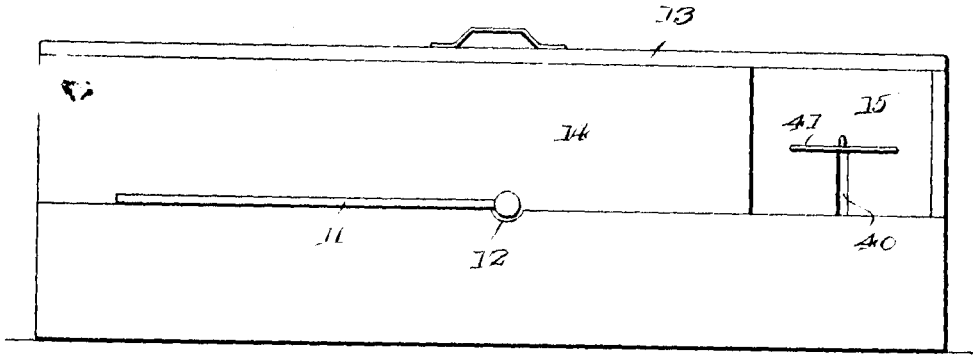
Figure 1 is a side elevation of the trap showing the trapping element in its set or inactive position.
Figure 2:
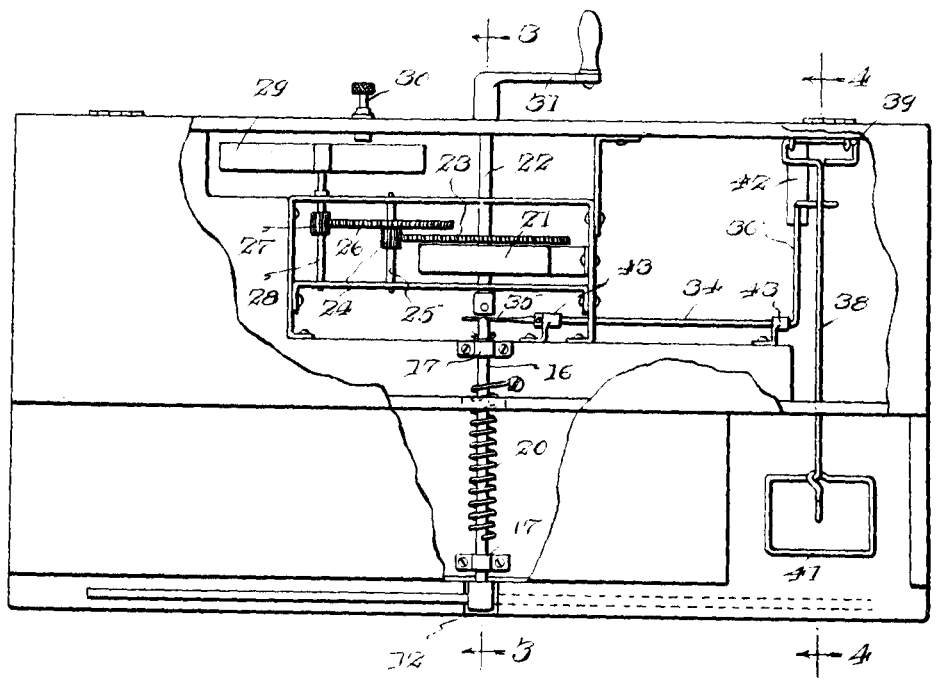
Figure 2 is a top plan view partly in section.
Figure 3:
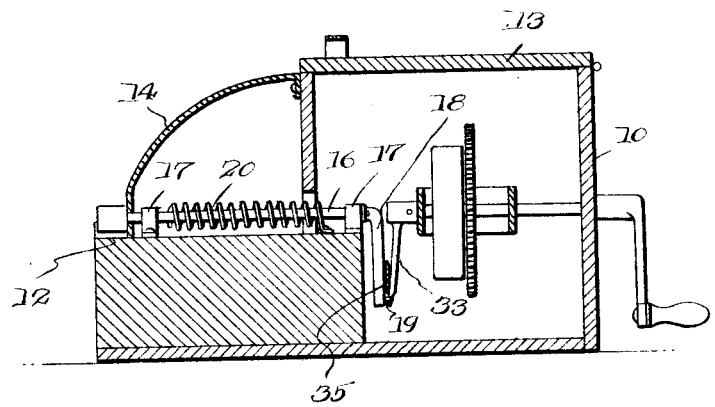
Figure 3 is a sectional view taken on the line 3—3 of Figure 2, looking in the direction of the arrows.

Referring to the drawing in detail, 10 represents a casing in which is arranged the mechanism of the trap, with the exception of the trapping element which is in the nature of an arm indicated at 11, and which arm normally reposes upon a platform 12 which is arranged at one side of the casing as clearly shown in the drawings. The casing is provided with a hinged cover 13 so that access may be had to the interior of the casing from time to time as the occasion may require. The platform 12 is also covered by a shield 14 curved in cross section as shown in Figure 3, and secured to the platform and one side of the casing in any suitable manner. This shield however, terminates short at one end of the casing to provide a compartment 15 for the reception of a bait holder, the construction and operation of which will be hereinafter more fully described. Therefore, the trapping element or arm 11 is the only exposed part of the mechanism, and this arm is carried by one end of a shaft 16 which is journalled in suitable bearings 17 on the platform 12 and arranged transversely thereof. The inner end of this shaft is offset as at 18, and carried by this offset extremity is a pin 19 which cooperates with the resetting mechanism, whereby the trapping element or arm is automatically reset after each operation thereof. Surrounding the shaft 16 is a very strong coiled spring 20 which has one end connected with the platform 12 and its other end connected with said shaft, so that when the trapping element or arm 11 is arranged in the position illustrated in Figure 1, the spring 20 is placed under tension to forcibly throw the arm to an active position when released, the active position of this arm being illustrated by dotted lines in Figure 2.

The resetting mechanism is similar to a clock mechanism, in that it contains a clock spring 21 which is coiled about the shaft 22 arranged transversely of the casing 10 and in end to end relation with the shaft 16 above referred to. Carried by the shaft 22 is a large toothed wheel 23 which meshes with a pinion 24 carried by a shaft 25 which is journalled in the supporting structure for the mechanism and arranged in parallelism with the shaft 22. This shaft 25 supports a toothed wheel 26 which meshes with a pinion 27 carried by the shaft 28, which shaft is also arranged parallel with the shaft 25 and supports what I term a governor 29 which is used to permit the spring 21 to be wound when necessary. Cooperating with this governor 29 is a pin 30 which is arranged to slide through an opening in one side wall of the casing 10 and which pin when used is adapted to be arranged to engage the governor which prevents the latter and the various toothed wheels and pinions from rotating while the spring 21 is being wound. For the purpose of winding the spring I provide a crank handle or the like 31 which is adapted to be associated with the exposed end of the shaft 22. Supported by the inner end of this shaft 22 is a resilient finger 33 which is adapted to cooperate with the pin carried by the offset extremity of the shaft 16 during the resetting of the trapping element or arm 11.

Figure 4:
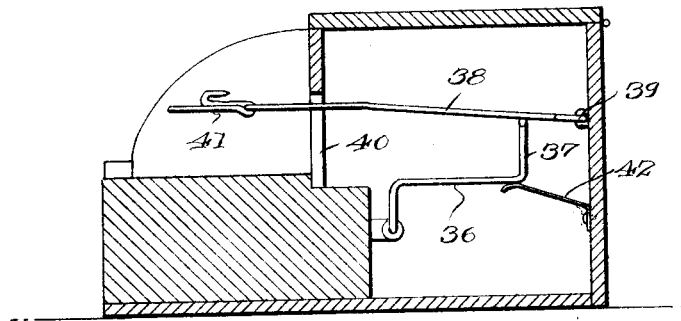
Figure 4 is a similar view taken on the line 4—4 of Figure 2, looking in the direction of the arrows.

Journalled within the casing 10 is a rod 34, one end of which is flattened like a knife blade as at 35, and which end is adapted to be positioned between the offset extremity 18 of the shaft 16 and the resilient finger 33 when these parts are arranged substantially parallel with the trapping element or arm 11 in a certain position. The other end of this rod 34 is offset at a right angle as at 36 and then extended upwardly as at 37 to support the rod 38. This rod is pivoted at one end as at 39 within the casing 10, while the other end passes through a slot 40 in the adjacent side wall of the casing and supports the bait holder 41. A suitable spring 42 bears against the offset extremity 36 of the rod 34, and normally holds the rod positioned in the manner shown in Figure 4.

In practice, the operation of the trap is as follows:

The pin 30 is pushed inwardly to engage the governor 39 which permits the spring 21 to be wound on the shaft 22 through the instrumentality of the handle 31. After the spring has been wound, the pin 30 is moved outwardly to allow the resetting mechanism to operate, whereupon the shaft 22 is rotated together with the resilient finger 33. As the finger moves into contacting engagement with the pin 19 it rotates the shaft 16 with the shaft 22 as a unit, until the trapping element or arm 11 is brought to the position shown in Figure 1, the contact of this arm with the platform 12 preventing further rotation of the said shafts, whereupon the finger 33 remains in contact with the pin 19 to hold the trapping element in the position just referred to. Now, when the animal projects his head within the compartment 15 in an effort to secure the bait from the holder 41, and depresses the bait holder for this purpose, the rod 38 is moved downwardly against the extension 37 of the rod 34, and thereby rocks the latter mentioned rod in its bearings 43. It is during this operation that the trapping element 11 is released, the knife portion 35 of said rod pressing against the resilient finger 33, which of course moves the finger away from the pin 19 releasing the shaft 16. Immediately the spring 20 which is very strong is brought into use and quickly and forcibly rotates the shaft 16, drawing the trapping element or arm 11 from the position shown in Figure 1 to its active position shown by dotted lines in Figure 2. During this operation, the trapping element or arm strikes the animal against the neck with such force and effect as to result in the breaking of the animal's neck, or cutting off the head of the animal, should the arm 11 be provided with a knife edge for this purpose. After the operation of the trap as just described, the spring 21 again rotates the shaft 22 bringing the resilient finger into contact with the pin 19, which again causes the shaft 16 and shaft 22 to rotate as a unit in the same direction, until the trapping arm or element 11 is reset for another operation of the trap, or in other words, returned to the position shown in Figure 1.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. An animal trap including a casing, a platform arranged at one side of the casing, a bait compartment arranged at one end of the platform, a spring actuated arm pivoted centrally of said platform and arranged parallel therewith, means within said casing for automatically positioning said arm on one-half of the platform and holding the same in a set position, and animal actuated means for releasing said arm, whereupon the latter is thrown onto the other half of the platform and across the front of said bait compartment for the purpose specified.

2. An animal trap including a casing, a platform arranged at one side thereof, a bait compartment at one end of the platform, a spring actuated arm pivoted centrally of the platform and normally arranged parallel therewith, spring actuated mechanism arranged within the casing for automatically turning said arm and arranging the same on one-half of the platform, and holding the same in a set position, and animal actuated means for releasing said arm, whereupon the latter is forcibly thrown onto the other half of the platform and across the bait compartment, said means including a bait holder disposed within the compartment.

3. An animal trap including a casing, a platform arranged at one side of the casing, a bait compartment at one end thereof, a shaft arranged across the center of the platform and mounted for partial rotation in either direction, an arm carried by one end of the shaft and normally arranged parallel with the platform, a spring surrounding said shaft and terminally connected therewith and with said platform, means arranged within the casing and operable to automatically turn the shaft to position the arm on one-half of the platform, and holding the latter in a set position, and animal actuated means including a bait holder arranged within the bait compartment for releasing said shaft, whereupon the latter is actuated by said spring to forcibly throw the arm on the other half of the platform and across the bait compartment for the purpose specified.

4. An animal trap comprising a casing, a platform arranged at one side thereof, a bait compartment at one end thereof, a spring actuated arm pivoted centrally of the said compartment and arranged parallel therewith, spring actuated clock like mechanism arranged within the casing and operable to turn said arm against the tension of its spring and position the arm on one-half of the platform, and hold the arm in a set position, a governor associated with said mechanism to permit winding of the spring thereof, and to release the mechanism for operation, and animal actuated means including a bait holder arranged within the bait compartment for releasing said arm from said mechanism, whereupon the arm is forcibly thrown onto the other half of the platform across the front of the bait compartment for the purpose specified.

5. An animal trap including a casing, a platform arranged at one side thereof, a bait compartment at one end of the platform, a spring actuated shaft arranged transversely across the center of the platform, an arm carried by one end of the shaft and normally arranged parallel with the platform, spring actuated clock like mechanism arranged within the casing and including a spring actuated shaft adapted to be intermittently rotated, and arranged in end to end relation with the first mentioned shaft, a resilient finger carried by the second mentioned shaft and arranged to engage the first mentioned shaft to rotate the latter against the tension of its spring and position said arm upon one-half of the platform and hold it in a set position, and animal actuated means for effecting the release of said first mentioned shaft, whereupon the arm is forcibly thrown onto the other half of the platform and across the front of the bait compartment, said means including a rod mounted for rocking movement and having a flattened portion positioned between the adjacent ends of said shafts to operate said parts when the rod is actuated, and a bait holder arranged to rock said rod when contacted by an animal.

In testimony whereof I affix my signature.

CHARLES C. ADDINGTON.